US011226830B2

(12) United States Patent
Iijima et al.

(10) Patent No.: US 11,226,830 B2
(45) Date of Patent: Jan. 18, 2022

(54) SYSTEM FOR BUILDING, MANAGING, DEPLOYING AND EXECUTING REUSABLE ANALYTICAL SOLUTION MODULES FOR INDUSTRY APPLICATIONS

(71) Applicant: Hitachi, Ltd., Tokyo (JP)

(72) Inventors: Koichiro Iijima, Los Gatos, CA (US); Song Wang, San Carlos, CA (US); Hideki Nakamura, Menlo Park, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 16/436,473

(22) Filed: Jun. 10, 2019

(65) Prior Publication Data

US 2020/0387387 A1 Dec. 10, 2020

(51) Int. Cl.
*G06F 9/445* (2018.01)
*G06F 9/451* (2018.01)
*G06F 16/21* (2019.01)
*G06F 11/36* (2006.01)

(52) U.S. Cl.
CPC .......... *G06F 9/44589* (2013.01); *G06F 9/451* (2018.02); *G06F 11/3664* (2013.01); *G06F 11/3688* (2013.01); *G06F 11/3692* (2013.01); *G06F 16/212* (2019.01)

(58) Field of Classification Search
CPC .... G06F 9/44589; G06F 9/451; G06F 16/212; G06F 11/3664; G06F 11/3688; G06F 11/3692
See application file for complete search history.

(56) References Cited

U.S. PATENT DOCUMENTS

| 2012/0078913 | A1* | 3/2012 | Muni | G06F 16/214 |
| | | | | 707/740 |
| 2016/0239749 | A1* | 8/2016 | Peredriy | G06Q 10/04 |
| 2018/0025276 | A1 | 1/2018 | Hill et al. | |
| 2018/0121171 | A1* | 5/2018 | Subramaniyan | G06F 8/35 |
| 2020/0210325 | A1* | 7/2020 | Allweil | G06F 11/3688 |

OTHER PUBLICATIONS

"Internet of Things for insights from connected devices: Industrie 4.0—IBM Cloud Garage Method." https://www.ibm.com/cloud/garage/architectures/iotArchitecture/industrie_40; retrieved on Jun. 10, 2019; 2 pages.

(Continued)

*Primary Examiner* — S. Sough
*Assistant Examiner* — Stephen D Berman
(74) *Attorney, Agent, or Firm* — Procopio, Cory Hargreaves & Savitch, LLP

(57) ABSTRACT

Example implementations described herein are directed to a meta-data processing system that supports the creation and deployment of the Analytical Solution Modules in development of industrial analytics. The example implementations described herein can involve a first system configured to be directed to a data scientist for receiving flow and operator definitions to generate an analytics library, which is provided to a second system configured to be directed to a domain expert for applying the analytics library to generate analytics modules to be executed on data input to the second system.

15 Claims, 12 Drawing Sheets

(56) References Cited

OTHER PUBLICATIONS

"Azure solutions for Internet of Things (IoT Suite) | Microsoft Docs." https://docs.microsoft.com/en-us/azure/iot-suite/iot-suite-what-is-azure-iot; retrieved on Jun. 10, 2019; 3 pages.
GE Predix Platform, https://www.ge.com/digital/iiot-platform; retrieved on Jun. 10, 2019; 3 pages.
Extended European Search Report for related European Application No. 20162917.7 dated Aug. 31, 2020 (13 pages).

* cited by examiner

Learning
AssociatedDataSetName: Pump
SensorNames: Speed,CyclonePressure,DischargeFlow,CycloneFeedDensity,Cyclone
TimestampName: Date
TimestampFormat: M/d/yyyy H:mm
OperationCondition: PumpRunStatus=="RUN"
NumKPIs: 1
KPINames: Speed_Inverse
KPIExpr: 300-Speed
LoadExpressions: CyclonePressure,DischargeFlow,CycloneFeedDensity,CycloneFeed
KPIsToMonitor: Speed_Inverse_Norm

Test
AssociatedDataSetName: PumpTest
TimestampFormat: M/d/yyyy H:mm

FIG. 11

SYSTEM FOR BUILDING, MANAGING, DEPLOYING AND EXECUTING REUSABLE ANALYTICAL SOLUTION MODULES FOR INDUSTRY APPLICATIONS

BACKGROUND

Field

The present disclosure is generally related to data analytics, and more specifically, to systems for managing and deploying analytical solution modules for industry applications.

Related Art

Data-driven industrial applications have been widely adopted in various domains to reduce cost and improve efficiency. Over the years, numerous analytical models have been created and verified in production. However, the valuable analytical models cannot be easily reused in new scenarios. Normally for new projects, analytical models have to be created and implemented from scratch by data scientists. Such related art implementations are expensive, slow-moving and not scalable. Reusable analytical models are imperative for affordable data-driven industrial applications.

Using pre-packaged libraries for analytics have been adopted as the de facto practice for generic analytic engines. For example, R engine and Python engine have numerous libraries to conduct various analytic tasks. However, all these libraries are algorithm oriented and have been created to reduce the workload for data scientists. Further, all the libraries are engine dependent in the sense that the user has to consider the execution engine when picking the libraries.

Cloud based Analytic-As-A-Service has been promoted by multiple vendors. These platforms package analytics as web based microservices and provide analytic functionality as part of their cloud service offerings. These platforms focus on deploying analytic libraries on to cloud and provide user friendly visualization on the analytic results.

To reuse analytical models, some standard interfaces are needed. Analytical Solution Modules involve well-defined, well-documented, pre-packaged, re-deployable analytical models. Each analytical solution module is a deployable module which is generalized from corresponding use cases and is formalized and categorized for solving one specific analytical problem. Using Analytical Solution Modules will promote and expedite the development of industrial analytical solutions. However, effectively understanding and using of large amount of analytical solution modules is a challenge in practice.

SUMMARY

Example implementations are directed to analytical solution modules that are problem-oriented, self-contained and execution engine transparent. The targeted audience of analytical solution module is domain experts, who may not have profound knowledge on details of low-level analytic functions. Instead, example implementations described herein are directed to the problem-oriented generalization, organization and categorizing of industrial analytics. The analytical solution modules described herein are platform independent and can be extended as web based microservice hosted on cloud.

Example implementations described herein involve a two-stage approach that solves the scalability problem by utilizing the rich meta-data associated with the analytical solution modules. The meta-data is created by the data scientists following a standard format to describe all the necessities to customize, deploy and execute the analytical module. After processing the meta-data, the system can: (1) automatically generate customizable analytical solution module templates; (2) generate deployable analytical solution modules after instantiations.

Example implementations described herein involve the following key differentiators: (1) a system that automatically generates executable analytic pipelines for various execution engines based on analytical solution module metadata and user customization; (2) standard interfaces and protocols to bridge all pieces of work done by multiple roles in the development of industrial analytical applications; (3) a system that manages, deploys and executes analytic pipelines on cloud or edge servers.

The example implementations described herein can facilitate the following implementations, such as but not limited to: (1) improving reusability of analytical solution modules; (2) reducing development cost of similar industrial analytical applications; (3) reducing maintenance and upgrading cost of industrial applications sharing same analytical solution modules; (4) decoupling roles in development of industrial analytical applications; (5) decoupling the analytical work from targeted execution environment of deployments.

Example implementations involve a meta-data processing system that supports the creation and deployment of the analytical solution modules in development of industrial analytics. In example implementations there is a two-stage meta-data processing approach that systematically separates the stable meta-data and customizable meta-data of analytical solution modules. In the first stage, a system unit that processes the inputs from a data scientist and generates stable analytic solution module template library is utilized. The first stage can involve a validation and testing process for quality control of the inputs from the data scientist, a flexible schema matching paradigm to facilitate generalization of analytical solution modules, and a hierarchical model assignment scheme from training to application phases to satisfy various customer use cases.

In the second stage, there is a system unit that combines the user customization with the template library and generates building files for service-oriented components, which can involve a process to generate building files according to dependency among services, wherein the services can be built and deployed in the cloud or on the edge.

Aspects of the present disclosure can involve a method, which can include providing meta-data involving flow definitions, operator definitions, and executable code to a first system configured to generate an analytics library into a database, the analytics library involving a flow configuration template, operator configuration template, analytics platform configuration template, and wrapper code for instantiations of the flow configuration template, the operator configuration template, and the analytics platform configuration template; executing a verification process on the executable code, wherein upon successful verification, facilitating access to the analytics library to the database in a second system; wherein the second system instantiates executable analytics modules from executing the wrapper code on the flow configuration template, the operator configuration template, and the analytics platform configuration template.

Aspects of the present disclosure can involve a non-transitory computer readable medium, storing instructions for executing a process, the instructions involving providing meta-data involving flow definitions, operator definitions, and executable code to a first system configured to generate an analytics library into a database, the analytics library involving a flow configuration template, operator configuration template, analytics platform configuration template, and wrapper code for instantiations of the flow configuration template, the operator configuration template, and the analytics platform configuration template; executing a verification process on the executable code, wherein upon successful verification, facilitating access to the analytics library to the database in a second system; wherein the second system instantiates executable analytics modules from executing the wrapper code on the flow configuration template, the operator configuration template, and the analytics platform configuration template.

Aspects of the present disclosure can involve a system, which can include means for providing meta-data involving flow definitions, operator definitions, and executable code to a first system configured to generate an analytics library into a database, the analytics library involving a flow configuration template, operator configuration template, analytics platform configuration template, and wrapper code for instantiations of the flow configuration template, the operator configuration template, and the analytics platform configuration template; means for executing a verification process on the executable code, wherein upon successful verification, means for facilitating access to the analytics library to the database in a second system; wherein the second system instantiates executable analytics modules from executing the wrapper code on the flow configuration template, the operator configuration template, and the analytics platform configuration template.

Aspects of the present disclosure can involve a system, which can involve a first system involving a first processor configured to process meta-data involving flow definitions, operator definitions, and executable code to generate an analytics library into a database, the analytics library involving a flow configuration template, operator configuration template, analytics platform configuration template, and wrapper code for instantiations of the flow configuration template, the operator configuration template, and the analytics platform configuration template; and execute a verification process on the executable code, wherein upon successful verification, the first processor is configured to facilitate access to the analytics library to the database in a second system; a second system involving a second processor configured to instantiate executable analytics modules from executing the wrapper code on the flow configuration template, the operator configuration template, and the analytics platform configuration template.

BRIEF DESCRIPTION OF DRAWINGS

FIG. 11 illustrates sample GUIs are grouped together for each role, in accordance with an example implementation.

DETAILED DESCRIPTION

Figure 1:
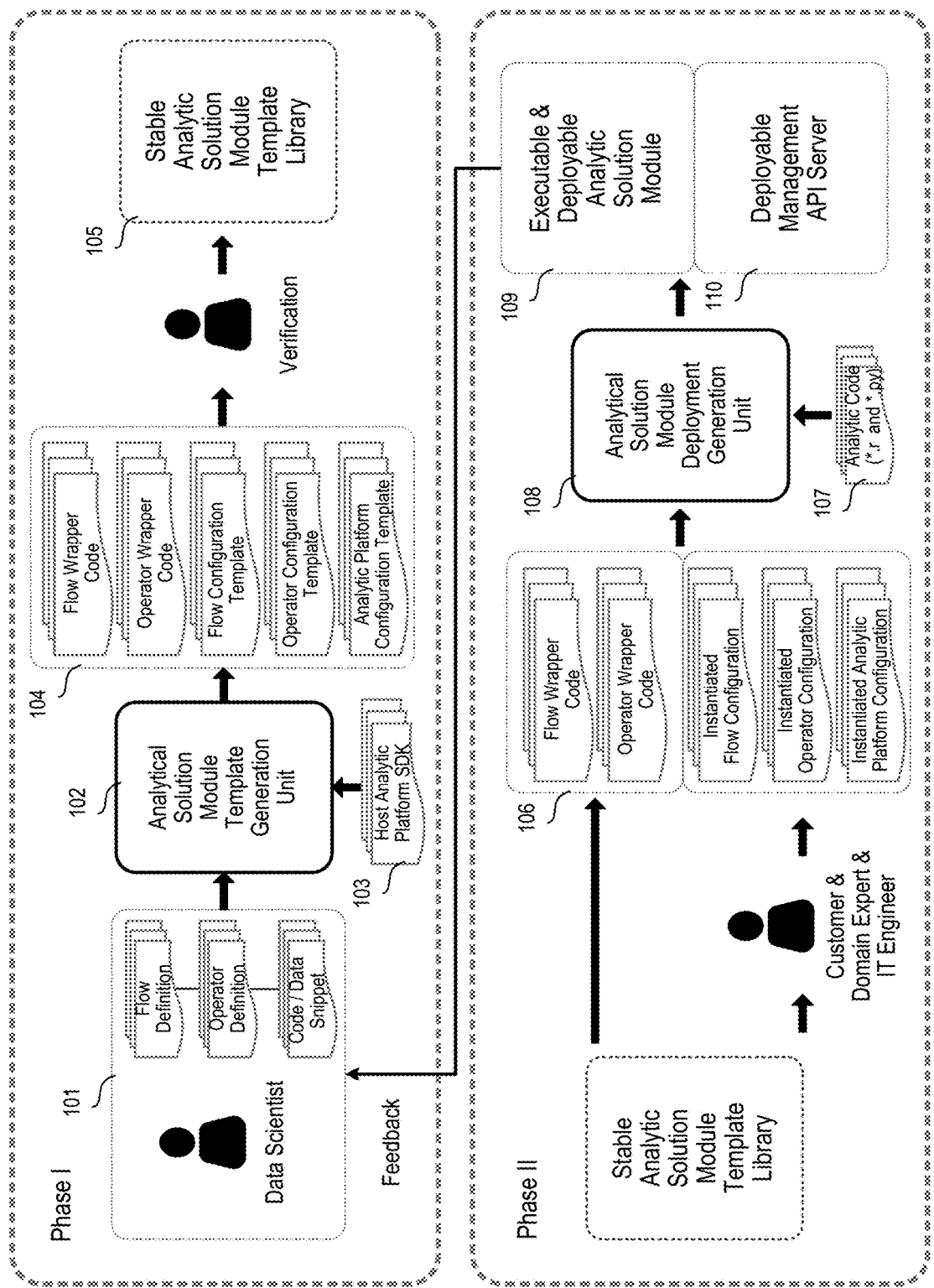
FIG. 1 illustrates the overview architecture of the system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Overview of Analytical Solution Module and Reusability

Analytical models in production can be invaluable assets for industrial applications. However, the analytical models are created and implemented from scratch by data scientists for a new project, which is a heavy burden for expensive data scientists. Further, it takes a long time to develop analytical models from scratch for new project. Even worse it is almost impossible for someone other than data scientists, such as production engineers or domain experts, to develop and manage analytical models, due to the lack of deep analytics and implementation knowledge for the analytical models.

To resolve these problems, the existing analytical models are commonly generalized and packaged into libraries. These pre-packaged analytical models are referred herein as "Analytical Solution Module(s)". Analytical solution modules normally have following properties: (1) A solution module is a repeatable unit of analytics that solves a business problem to be monetized. (2) Same business problem may be solved by several solution modules depending on: data types, data properties and execution requirements. (3) A solution module should be easy for domain experts to choose and use given a business problem. (4) A solution module encompasses the data scientist and domain expert knowledge. (5) A solution module requires one or more execution engines (enablers). By re-using Analytical Solution Modules, time and cost of developing projects can be largely reduced.

Analytical solution modules are created and accumulated over the time and the libraries will be too big to handle manually. A system to manage the analytical solution modules is needed for scalability and reusability.

Overview of the Components and Actors

Analytical Solution Modules are implemented and deployed as templates on the example implementations described herein. The example implementations described herein involve a system that conducts selection, configuration and deployment of templates to support domain experts to use the Analytical Solution Modules. The main components and actors are:

Data Scientist: Analytics experts to generalize and create analytical solution modules.

Domain Expert: Industrial analytical application creator who has the deep knowledge of know-how in specific domain.

Customer: End user of industrial analytical application.

Analytical Model: The result of training process that can be used to perform machine learning and artificial intelligence (AI) tasks. The broad analytical model may also include the learning process that generates the model.

Analytical Solution Module Repository: A system or service that persistence and manages analytical solution modules.

Analytical Platform: A generic system or service that deploys the analytical solution modules and orchestrates the execution of analytical solution modules.

Overview of the System: Inputs and Outputs

FIG. 1 presents the overview architecture of the system, in accordance with an example implementation. As illustrated in FIG. 1, there is a two stage (Phase I and Phase II) meta-data processing system that automatically generates the stable analytical solution module template library and further deployable analytical services. The system includes two processing units: Analytical Solution Module Template Generation Unit 102 and Analytical Solution Module Deployment Generation Unit 108.

Data scientists provide inputs 101 to the Analytical Solution Module Template Generation Unit 102. The inputs 101 include the standard description of the analytical operators and data pipeline (e.g., data flow) used. Also, the inputs include the corresponding code in R, Python or other languages in accordance with the desired implementation. For testing, the sample data set should also be included.

The Analytical Solution Module Template Generation Unit 102 generates the template meta-data files according to the inputs from the data scientists and the software development kit (SDK) application programming interface (API) of the targeted analytical platform.

The SDK API of the host analytical platform 103 is configured to support at least: (1) pipelined execution; (2) user defined function calls.

The outputs 104 from Analytical Solution Module Template Generation Unit 102 include wrapper code for operators and flows depending on the API from host analytical platform 103. The flow and operator template configurations are language-agnostic to the analytical operators.

The Stable Analytic Solution Module Template Library 105 persist the stabilized templates in the library after human verification.

The inputs 106 to the Analytical Solution Module Deployment Generation Unit 108 include the stable template wrappers and the instantiated template configurations by the customers, domain experts and information technology (IT) engineers. Each instantiation is targeted for a specific use case. The analytical code 107 is provided from the inputs 101. The Analytical Solution Module Deployment Generation Unit 108 generates the deployable analytical solution modules together with helper services for management. The output 109 of the Analytical Solution Module Deployment Generation Unit 108 is provided to analytical solution modules. These modules can be deployed on the cloud or on the edge server. The output 110 of Analytical Solution Module Deployment Generation Unit 108 for helper modules that manage the services of the output 109 to the analytical solution modules. The helper module also includes the services of the host analytical platform.

The inputs 101 involve all the contributions from the data scientists as wrapped up. The definitions use a standard, programming language-agnostic interface to describe the underlining analytics. As illustrated in FIG. 1, inputs 101 can include the following:

Operator Definition: For each implementation, data scientists need to create interface definitions with formal, computer-readable specifications to be used further in data flow definitions. Such atomic, self-contained analytics functions are called "Operators". In the Operator Definition, data scientists need to describe the input and the output data schema structure of the function, also the configuration parameters and other necessary execution properties of the operator implementations. The operator definition is analytic platform independent. Each analytic platform vendor needs to create their own wrapper for the specified operator.

Flow Definition: Flow Definition describes how to connect and integrate multiple operators in a pipeline or iteration. In addition, the flow-level input/output data schemas and the parameters are also defined. The Flow Definition is written in a formal computer-readable specification format.

Code and Data Snippet: The main analytic functions and supporting functions for each operator are wrapped up into packages that can be loaded and executed in an analytical platform. If the data scientist provides testing data and testing result, the unit testing cases can also be included.

The output wrapper code 104 wraps up the outputs from the Analytical Solution Module Template Generation Unit 102. As illustrated in FIG. 1, the wrapper code 104 may involve the following:

Flow Wrapper Code: Different analytic platforms may use unique flow representations. The analytic data flow has to be converted to follow the interface of each specific analytic platform. The flow wrapper code may also include the implementations to satisfy required flow control in the targeted host analytic platform.

Operator Wrapper Code: This wrapper code is used to implement the user defined function call interface of the host analytic platform. This wrapper code may also include the implementation of remote process call to other analytic libraries or services in the cases that the actual work is done outside of the platform.

Flow Configuration Template: This template includes flow level parameters that can be customized by domain experts in the Analytical Solution Module Deployment Generation Unit 108 of the second phase processing. The parameters may vary from one platform to another. Such parameters can include: the flow level global variables, the data link between flows (for example the message queue names), execution frequency of flows.

Operator Configuration Template: This template includes operator level parameters to be instantiated by domain experts. The parameters are defined in the corresponding operator definition and exposed to the second phase processing. The template can include: the data frame assignment of in and out data frames, operator level parameters, schema parameters.

Analytic Platform Configuration Template: This template includes system level parameters to be set by IT engineers before deployment and execution. The system information includes for example: network setup of the platform, security/authentication setup, path and uniform resource locator (URL) setup.

The two-stage meta-data processing approach systematically separates the stable meta-data and customizable meta-data of analytical solution modules. In the first stage, stable templates are generated from the meta-data provided by the data scientists describing all the requirements to execute the analytical module. At the same time, wrapper code is also generated incorporating to the host platform SDK API. In case that multiple analytical platforms are targeted, a different set of wrapper codes are generated for each platform. In the second stage, the stable templates will be customized to fit each use case. By combining the stable wrapper code and instantiated templates, final deployable analytical solution services will be generated, together with helping services.

A sample usage of the example implementations can be as follows. Analytical Solution Modules are implemented and deployed as templates on an execution engine/analytical platform by data scientists. Further, the Analytical platform provides automated selection, configuration and deployment of templates to support domain experts to use the Analytical Solution Modules. Domain experts select suitable templates according to business problems, configure data sets and parameters for the templates, and generate executable instances of the template in terms of data flows. Execution of learning (training)/application process is hidden in the backend of the analytical platform. Learned analytical models and parameters configurations are managed (stored/retrieved) inside the analytical solution module repository service.

Analytical Solution Module Template Generation Unit

Figure 2:
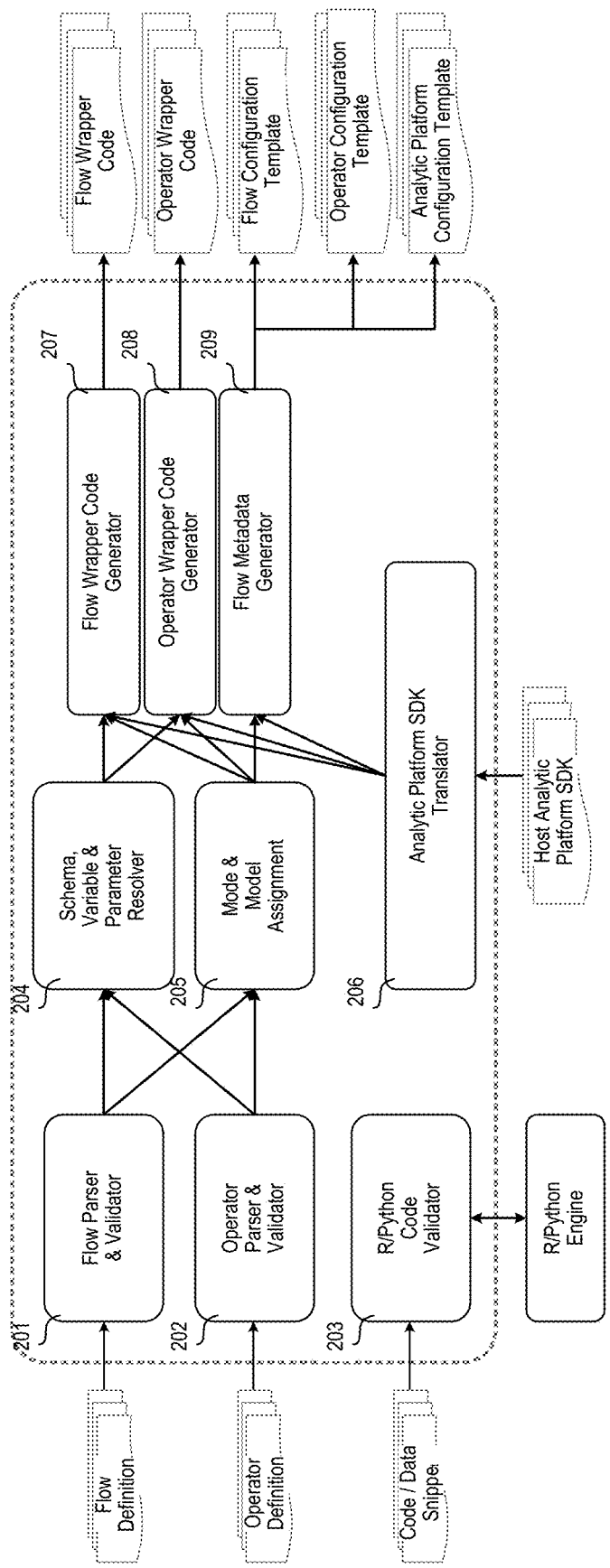
FIG. 2 shows the system components in the Analytical Solution Module Template Generation Unit, in accordance with an example implementation.

In the first meta-data processing stage, the Analytical Solution Module Template Generation Unit 102 is used to automatically generate the Stable Analytic Solution Module Template which will be persisted in the library and used in the second stage. FIG. 2 shows the system components in the Analytical Solution Module Template Generation Unit 102, in accordance with an example implementation.

The Flow Parser and Validator 201 processes the input flow definition files and conducts flow semantic validation. The Operator Parser and Validator 202 processes the input operator definition files and conducts operator semantic validation. The Code Validator 203 conducts unit test of provided analytical code from the data scientists and generates the unit performance report. The analytical code will be tested on external execution engine/environment programmatically. The Schema, Variable and Parameter Resolver 204 resolves the combined flow level schemas, variables and parameters. A dictionary is produced after analyzing the flow and operator meta-data. The parameterized schema and flexible schema resolution are supported. The Mode and Model Assignment 205 assigns execution mode (learning, testing or application) and hierarchical model to the operators and flows. The Analytic Platform SDK API Translator 206 maps the flow execution logic to the host analytic platform system calls through provided SDK API. Each host analytic platform requires a specific API translator. The Flow Wrapper Code Generator 207 generates the wrapper code for flow pipelining that can be executed on the targeted analytic platform. The Operator Wrapper Code Generator 208 generates the wrapper code for user defined function calls that can be executed on the targeted analytic platform. The Flow Metadata Generator 209 generates all the template files to be customized in the second stage. These templates are related to the target analytic platform.

The Solution Module Template Generator is analytic platform specific. That is, for each individual flow execution engine or orchestration platform, a special generator has to be created once for all the Analytics Solution Modules. The automated generation process (generator) will create wrappers for the operator interface, flow interface and other bridge code between Analytics Solution Module and the individual analytic platform. Thus, the instantiated Solution Module Template is executable on the targeted analytic platform, with close-coupled integration with the corresponding platform user interface (UI) and SDK API specification.

Analytic Code Snippet Validation and Quality Control

The Code Validator 203 validates analytic code submitted by the data scientists. At the same time, this component will enrich the meta-data with performance report. The meta-data provided by the data scientists focuses on the semantics of the analytics and should be platform orthogonal. On the contrary, the performance meta-data systematically collected in this component is platform related. This component is utilized to guarantee the quality of the analytic code and the performance information gathered can be further used for system recommendation based on the size of customer problem.

Figure 3:
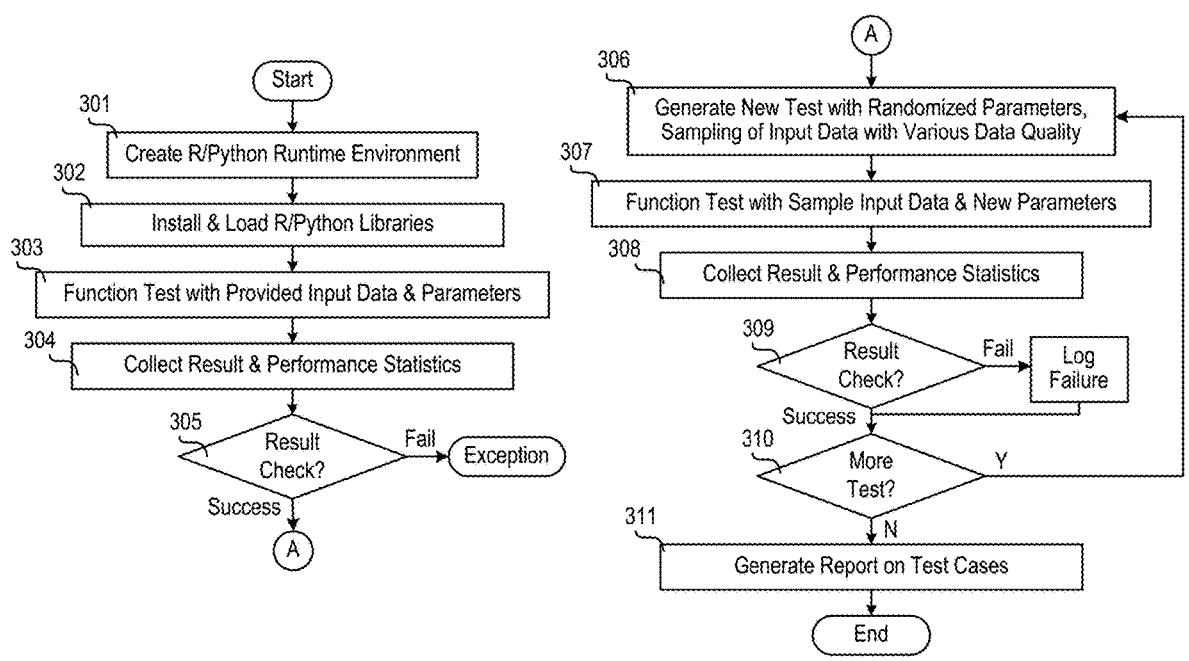
FIG. 3 illustrates the processing flow of the code validator, in accordance with an example implementation.

FIG. 3 illustrates the processing flow of the code validator 203, in accordance with an example implementation. The processing can be summarized as two parts. The first part is the baseline testing which uses provided test case by the data scientists. The second part is the extended stress testing that uses generate testing cases on input data sets and parameters. The extended stress testing cases ensure the applicability of the analytical solution modules on new use cases.

At 301, the code validator 203 creates the testing environment based on the operator definition files and installs and loads the corresponding libraries at 302. At 303, the code validator 203 conducts unit testing on provided input data and parameter settings as the baseline unit test, and collects the results and performance statistics at 304. At 305, the code validator conducts a result check to validate the result with provided results. An exact result match may not apply if the analytics includes randomization. If successful, the flow proceeds to 306, otherwise, an exception is generated.

At 306, the code validator 203 generates new test cases for the extended stress testing. The test cases can be generated from (but not limited to) the following variations: randomized parameter values considering type of the parameters; sampled input data set; data set with added missing values. At 307, a function test with sample input data and new parameters is conducted. At 308, the results and performance statistics are collected. At 309, the results are checked to determine if the results are successful, wherein if it fails then a log failure is generated, and wherein if successful the flow proceeds to 310. At 310, a determination is made as to whether more tests are required. If so (yes), the flow proceeds back to 306, otherwise (No) the flow proceeds to 311 to generate performance meta-data on reports.

Parameterized Schema and Flexible Schema Resolution

The Schema, Variable and Parameter Resolver 204 is a system component for schema resolution. Example implementations utilize the concept of Data Frame to represent the input data and output data of every operator. A data frame can be accessed by row or by column. The schema of a data frame is a list of column names and the corresponding primary data types, in the format of <ColumnName>@<DatyType>. The default data type is Numeric/Double and the @Numeric or @Double can be omitted.

Each data frame associates with one static schema. Here the static means the schema of the data frame is determined before runtime and will not change during runtime. That is, the schema and the corresponding data frame is one-to-one mapping during runtime. If a data frame is modified by adding or removing columns during runtime, it then becomes a new data frame and must have a new name. The schema of data frame can be parameterized. Before runtime, all parameters must be resolved to corresponding values. The parameterized schema provides more flexibility for data scientists to specify variable length schema for input data frames. The format for variable length schema specification can be:
FieldName-[SuffixOfNumberRange]@PrimaryDataType The '-' and '@' are reserved from using for schema field names. When such a schema is used, the data scientists can define an implicit parameter that denoting the length of variable fields. For example, the data scientists can define a schema field as following, which means a flexible number of sensor readings of double values. Inside the analytic code, the data scientists can refer to the parameter $N to get the value of the sensors. The hosting environment need to set the value of $N before runtime.
Sensor-[1 . . . $N]@Double Regular expression RegExpr is used to match the field names in the user schema to data scientists defined analytic schema. The format for schema matching is: TargetFieldName:RegExpr. There are four cases:

Default exact schema matching: TargetFieldName:UserFieldName. That is, the same field name in user schema will match the same field in the analytic schema.

Start * Schema matching: If the analytic schema specifies the matching with *, it means the data scientists do not require the corresponding field name in the user schema. That is, the data scientists will not refer to any field name that matched with *.

Single matching with multiple options: For example:
TargetFieldName:
UserFieldName1|UserFieldName2|UserFieldName3. This specification means the UserFieldName1 or UserFieldName2 or UserFieldName3 can match to TargetFieldName. However, there should only one matching field appearing in the user schema. The analytic schema will use the TargetFieldName to refer the corresponding field in the user schema.

Multiple matching with multiple options: For example, if the analytic schema defines flexible length schema, then the user schema can match multiple fields in the flexible schema. Following previous example,
Sensor-[1 . . . $N]@Double:Temp*|Speed*

If the user schema is: Temp1,Speed1,Temp2,Speed2. Then after schema matching, the analytic schema will be: Sensor-1,Sensor-2,Sensor-3,Sensor-4. And parameter $N=4 will be set, which can be used by data scientists to refer in the analytic code.

Figure 4:
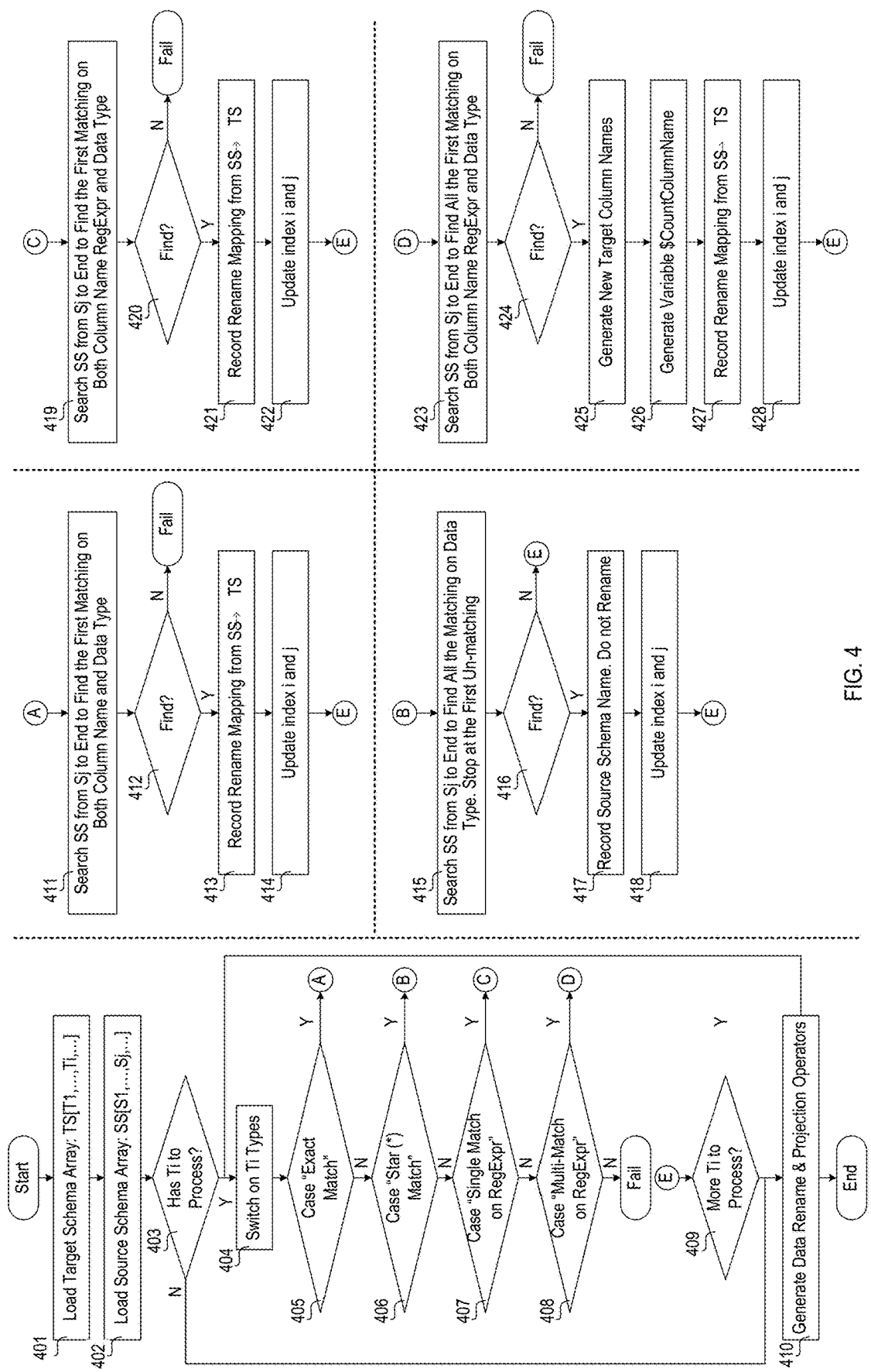
FIG. 4 illustrates the processing flow for the schema resolution in the Schema, Variable and Parameter Resolver, in accordance with an example implementation.

FIG. 4 illustrates the processing flow for the schema resolution in the Schema, Variable and Parameter Resolver, in accordance with an example implementation. The processing flow can be summarized into four major paths, each for one case of the flexible schema matching.

At 401 and 402, the target and source schema arrays are loaded. At 403, a loop is initiated for processing elements in the target schema array. At 404, schema matching is conducted on the elements in the target schema array. At 405, a determination is made as to whether it is an exact match. If so (Y), the flow proceeds to execute the flow at 411-414 to facilitate default exact schema matching. Otherwise (N), the flow proceeds to 406 to determine as to whether it is a star (★) match. If so (Yes), then the flow proceeds to execute the flow at 415-418 to facilitate Star (★) Schema matching. Otherwise (N) the flow proceeds to 407 to determine whether it is a single matching with multiple options. If so (Y), then the flow proceeds to execute the flow at 419-422 to facilitate single matching with multiple options. Otherwise (N), the flow proceeds to 408 to determine whether it is multiple matching with multiple options. If so (Y), then the flow proceeds to execute the flow at 423-428 to facilitate multiple matching with multiple options, otherwise (N) the flow is failed.

The flow at 411-414 facilitates the default exact schema matching. At 411, a search is conducted on each element in the source schema array to find the first match for both the column name and data type. At 412 a determination is made as to whether it was found. If not (N) then the flow fails, otherwise (Y) the flow proceeds to 413 to record the mapping renaming from the source schema to the target schema. At 414, the indexes i and j are updated.

The flow at 415-418 facilitates Star (★) Schema matching. At 415, a search is conducted to search the source schema array to find all the data type matches, and will stop at the first unmatched array element. At 416, a determination is made as to whether an unmatched array element is found. If not (N) then the flow fails, otherwise (Y) the flow proceeds to 417 to record the source schema name without renaming the source schema. At 418, the indexes i and j are updated.

The flow at 419-422 facilitates single matching with multiple options. At 419, a search is conducted to search the source schema array to find the first match on both column name RegExpr and data type. At 420, a determination is made as to whether such a match is found. If not (N) the process fails, otherwise (Y) the flow proceeds to 421 to record the mapping renaming from the source schema to the target schema. At 422, the indexes i and j are updated.

The flow at 423-428 facilitates multiple matching with multiple options. At 423, a search is conducted to search the source schema array to find all matches for both the column name RegExpr and data type. At 424, a determination is made as to whether matches are found. If not (N) then the process fails, otherwise (Y) the flow proceeds to 425 to generate new target column names. At 426, the flow generates the variable $CountColumnName. At 427, the flow records the mapping renaming from the source schema to the target schema. At 422, the indexes i and j are updated.
Hierarchical Model Assignment Scheme from Learning Phase to Application Phase The Mode and Model Assignment 205 is a system component for model assignment. In example implementations, the component supports flexible hierarchical model deployment pattern from learning phase to application phase. This specification is independent from analytic problem solved by the data scientists. The model assignment specifies which equipment data is used in the learning mode to generate the machine learning models and parameters. Also, it specifies which learned model will be consumed in the application mode execution.

Figure 5:
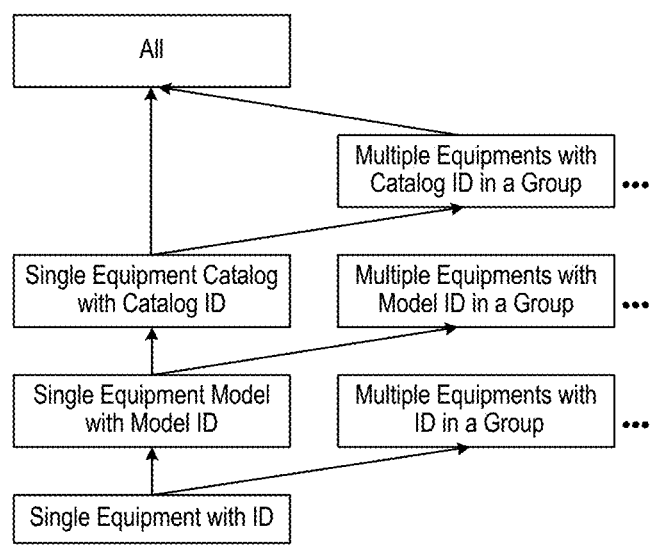
FIG. 5 illustrates the analytical model hierarchy used, in accordance with an example implementation.

FIG. 5 illustrates the analytical model hierarchy used, in accordance with an example implementation. Three basic model deployment patterns are supported: (1) generating models per equipment catalog; (2) generating models per equipment model type; (3) generating models for specific equipment patterns. Based on the three basic types, the extended deployment patterns on a group of corresponding identifiers (IDs) can also be defined.

After processing, different templates are generated according to the model deployment pattern settings. At runtime, multiple analytic models can be generated and persisted by running learning phase on top of different equipment data. These analytic models will further be used in following application phases.

Figure 6:
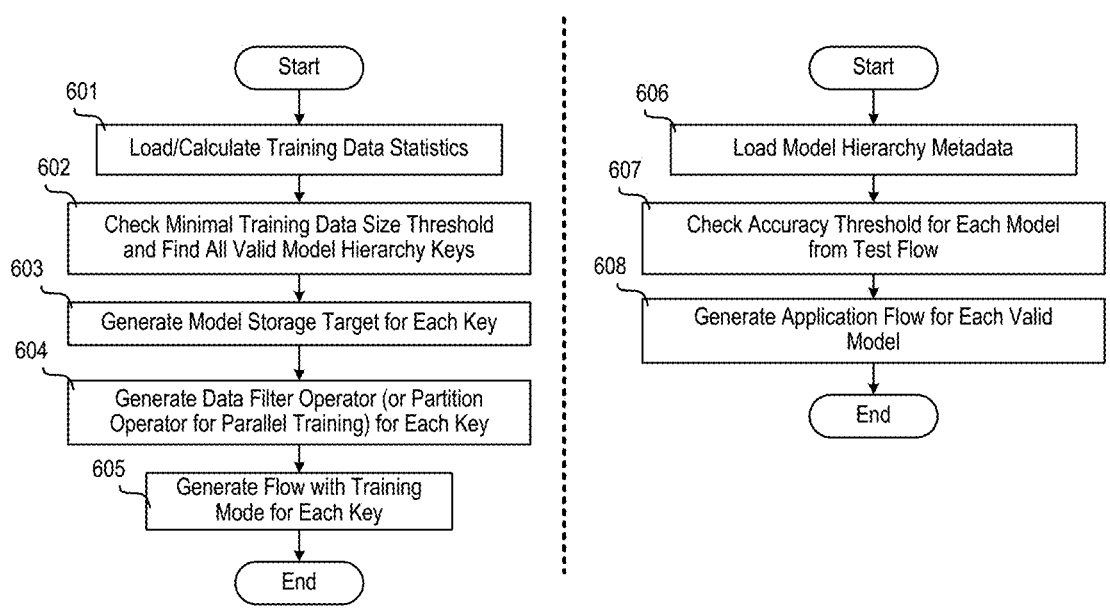
FIG. 6 illustrates the processing flow for flexible analytical model assignment, in accordance with an example implementation.

FIG. 6 illustrates the processing flow for flexible analytical model assignment, in accordance with an example implementation. Based on the statistics of the input training data, this component will find all valid model hierarchy keys and generate corresponding helper operators in the data flow template files.

At 601-605, the flow generates the valid model assignment for the training flow. At 601, the flow loads and calculates the training data statistics. At 602, the flow checks minimal training data size threshold, and finds all valid model hierarchy keys. At 603, the flow generates the model storage target for each key. At 604, the flow generates the data filter operator (or partition operator for parallel training) for each key. At 605, generates the flow with training mode for each key.

The flow from 606-608 facilitates the generating of the valid model assignment for the application flow. At 606, the flow loads the model hierarchy metadata. At 607, the flow checks the accuracy threshold for each model from the test flow. At 608, the flow generates the application flow for each valid model.

Analytical Solution Module Deployment Generation Unit

Flexible deployment of analytical solution modules on both cloud and edge servers are essential for reusability. Example implementations support services-oriented deployment of analytical modules associated with corresponding analytical platform. The deployment generation unit 108 is configured to create all the necessary services for the analytical modules and the management services. The generators will create the service configuration files (for example, the docker files) first and then compiled into executable binaries (for example, the docker image files or other virtual machine images). The executable binaries can be further persisted in external service storage (for example, the docker registry). The deployment generation unit 108 can be adopted to other virtual image ecosystem other than the Docker in a straightforward way.

Figure 7:
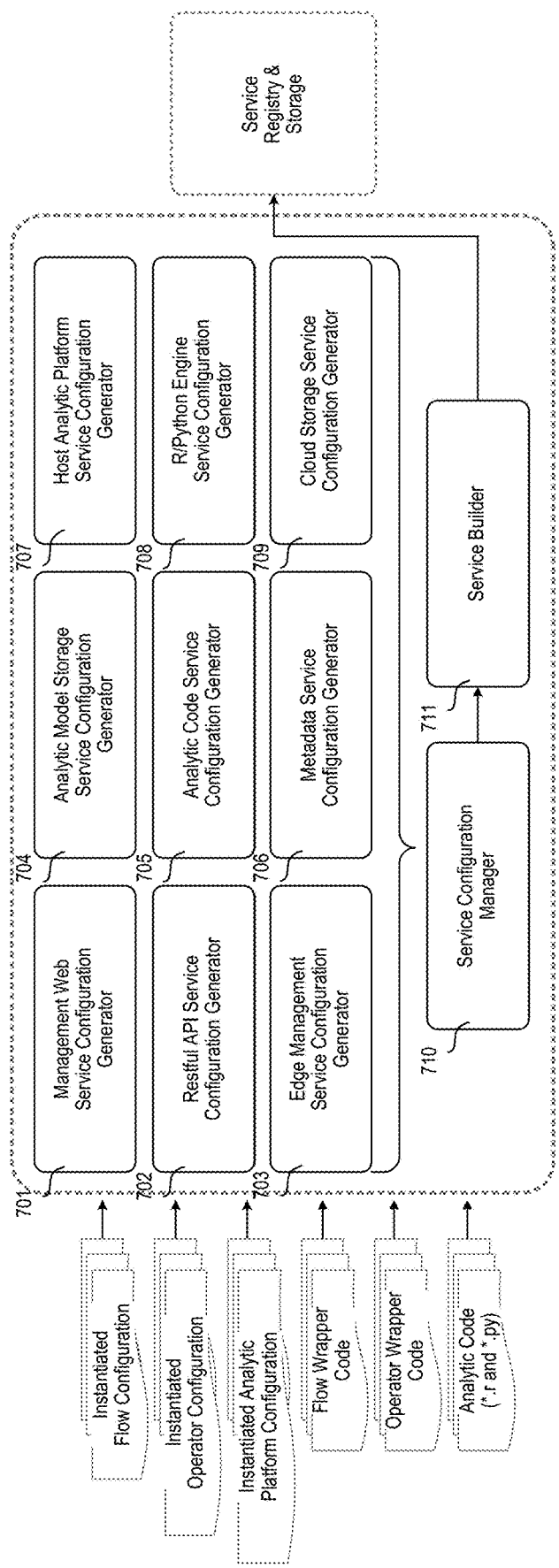
FIG. 7 illustrates the system components in the deployment generation unit, in accordance with an example implementation.

FIG. 7 illustrates the system components in the deployment generation unit 108, in accordance with an example implementation. FIG. 7 illustrates the service configuration generators for all related services. The Management Web Service Configuration Generator 701 provides GUI for end user for runtime management of the data flows and analytical models. The Restful API Service Configuration Generator 702 is utilized for programmatical management of other services. The Edge Management Service Configuration Generator 703 is used for remote management of the edge servers for running analytical modules. The Analytic Model Storage Service Configuration Generator 704 is a centralized service that manage the access of the persisted analytical models. The Analytic Code Service Configuration Generator 705 is used to host and access the versioned analytical code files. The Metadata Service Configuration Generator 706 is used to host and access the instantiated templates. The Host Analytic Platform Service Configuration Generator 707 wraps up the host analytic platform and provides SDK API access to the platform. The R/Python Engine Service Configuration Generator 708 wraps up the external analytical execution environment for analytical code. The Cloud Storage Service Configuration Generator 709 is used to host data models to be synchronized from Cloud to Edge. The Service Configuration Manager 710 manages all generated configuration files for services. The Service Builder 711 calls external utilities to create executable binaries and stores the executable images into external storage.

Separation of Services

The components 701-709 are responsible for generation of each corresponding service configurations. Example implementations described herein include the following special design consideration to separate the whole application into a set of services:

1. Separation of R/Python Analytical Engine from analytical code: The analytical code from data scientist is prone to update and versioning. This decoupling makes it doable for separated management responsibility of IT engineer and data scientist.

2. Separation of analytic models from all others: Analytic models are the result of learning process and is subject to special management. This separation can preserve customer privacy and intellectual property.

3. Separation of analytical solution module metadata from all others: This separation facilitates the role based industrial analytical solution development.

Figure 8:
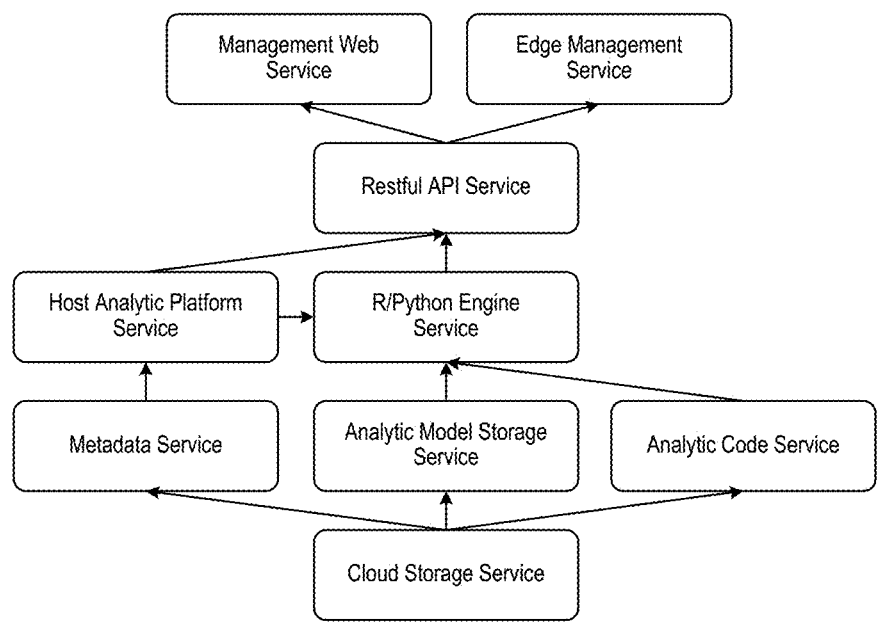
FIG. 8 illustrates the dependency graph between services, in accordance with an example implementation.

4. Service Configuration Dependency: The example implementations described herein utilizes a dependency graph to capture the generation ordering of corresponding services. FIG. 8 illustrates the dependency graph between services, in accordance with an example implementation. The dependency is the meta-data dependency for generating the service configuration files, instead of the runtime service dependency. For example, the generation of the Restful API service configuration file need meta-data about all the network address and URLs of other services. Thus, the Restful API service configuration file has to be generated after other managed service configuration files.

Service Configuration Generation

Following the dependency graph as illustrated in FIG. 8, the components 701-709 in FIG. 7 will be invoked in the order to generate service configuration files. The steps in the 701-709 are similar to each other but are specific to the targeted service hosting ecosystem. The generation process in the components of 701-709 here only creates the statement or the command to build the service. The actual building process happens in component 711 of FIG. 7. The steps have following items in detail.

1. Select a base service: The generated service usually is based on other service template with basic features. For example, this step generates the FROM-clause for the Docker system.

2. Setup network: This step includes the collection of network settings from related services. Based on the existing network settings, the generated service can create its own network settings.

3. Copy instantiated files and code snippets: This step generates the commands to deal with the file system for the generated service. All related files need to be copied to the pre-defined locations.

4. Install packages: This step generates the commands to install prerequisites for the service. The packages can be software packages and library packages.

5. Service Initialization: This step generates the commands to initialize the service. The command is pre-defined and can vary from one service to other.

6. Start Service: This step generates the commands to start the service. The command is pre-defined and can vary from one service to other.

Accordingly, example implementations present an end-to-end toolkit for the creating and using analytical solution modules which is aiming at reusability and ease-of-development for industrial analytic solutions. The example implementations can be used to build problem oriented analytical solution modules library and industrial analytic solutions.

A web-based GUI can be built for multiple roles of the industrial application developers on top of this invention. The GUI frontend leverages on the backend REST API services to finish the tasks. Command line based client can also be developed to programmatically control the analytical solution modules through the same set of REST APIs.

Figure 9:
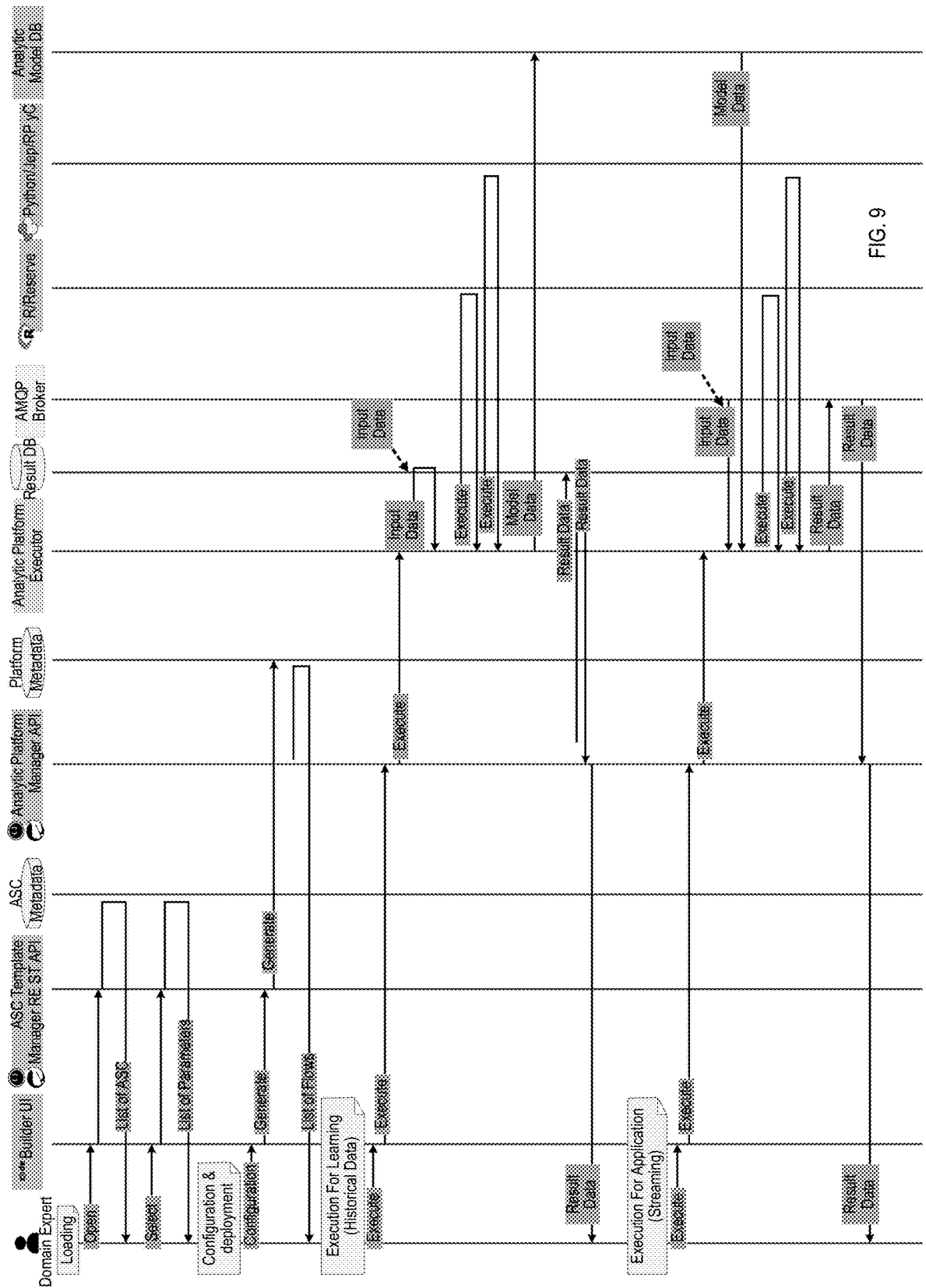
FIG. 9 shows an example sequence diagram of REST API calls to use analytical solution modules at runtime, in accordance with an example implementation.

FIG. 9 shows an example sequence diagram of REST API calls to use analytical solution modules at runtime, in accordance with an example implementation. For each individual REST API call, there exists a corresponding GUI step to achieve the same functionality. From the GUI (or other clients), the domain experts follow the work flow below. (1) Get the list of Analytical Solution Module Templates. (2) Select the one that is the best match for their needs based on metadata. (3) Configure parameters on the selected templates to customize. (4) Generate executable flows obeying the host analytic platform specification. (5) Execute the flows on the host analytic platform, which will in turn invoke the R and/or Python analytic engine/service.

If the flows are executed with the learning mode, the learned model and/or the parameter values will be stored in the Model DB. If the flows are executed with the test/application mode, the corresponding learned models associated with the flows will be retrieved from the Model DB and consumed in the subsequent analytics. The analytical result from the flows will be sent to dashboard (via AMQP) and/or to other user specified locations.

To facilitate the life cycle of analytical solution modules, the web-based GUI system has following special HCI modules.

Wizard for Analytical Solution Module Selection

Figure 10:
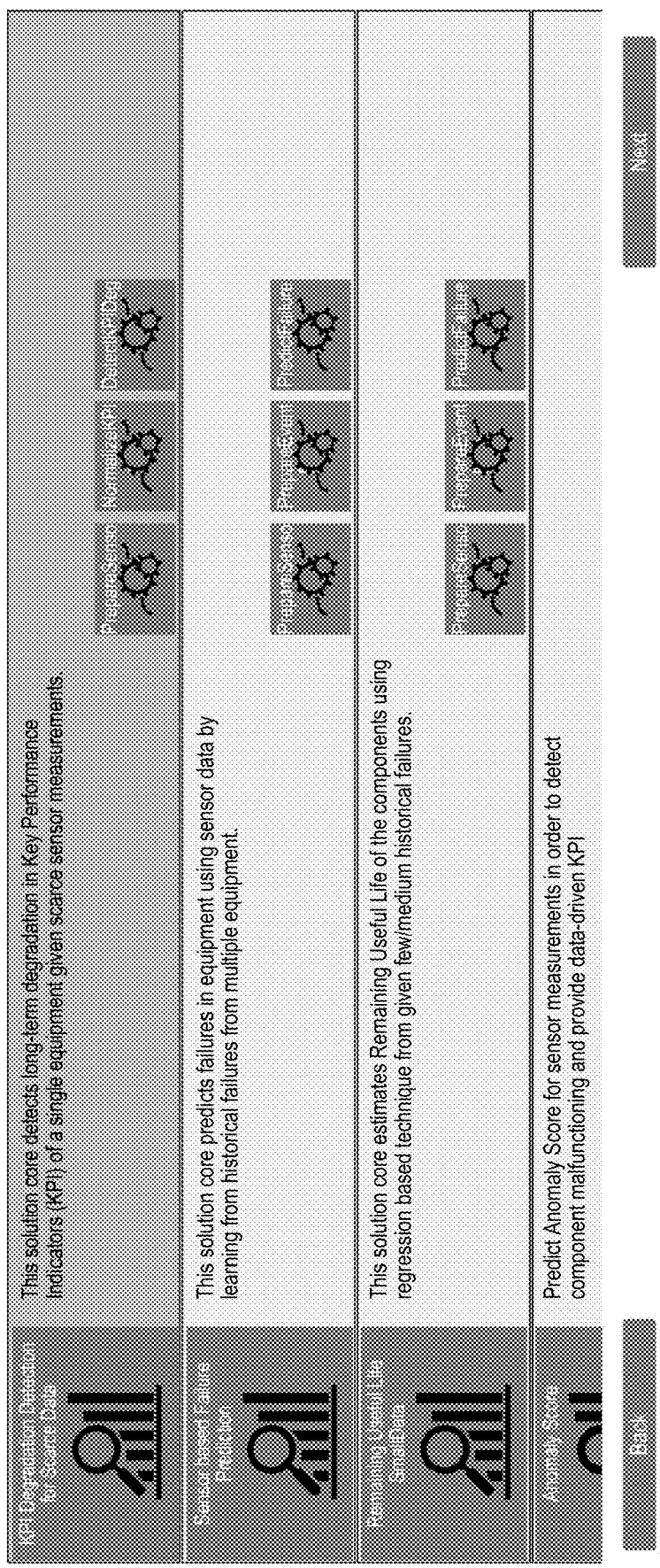
FIG. 10 illustrates a sample GUI for analytical solution module selection, in accordance with an example implementation.

FIG. 10 illustrates a sample GUI for analytical solution module selection, in accordance with an example implementation. This feature abstracts away machine learning details and prompts non-data scientists to use analytical solution modules without deep understanding of machine learning specific knowledge. When the analytical solution module is created, the data scientist needs to provide documented knowledge on following items.

(1) Description about analytical problem solved.
(2) Description of input data and corresponding schemas.
(3) Required properties of the input data (e.g. normalized or not, timeseries or not, and etc.).
(4) Meaning of each parameter and the typical settings.
(5) Sample input data and expected analytical model result.
(6) Limitations where the solution module cannot apply.

The documented knowledge is used to generate a wizard for recommending suitable solution module to the domain expert. By answering several questions on the input data types, amount of the data and the desired execution mode about the problems to be solved, the appropriate solution modules for the projects will be recommended to the users automatically. In this process, natural language processing (NLP) can be used to extract key words from the description text for classification and ranking.

Separated GUI for Different Roles

System configuration screens are separated to facilitate the different roles in the development of industrial analytic solutions. The GUI system shown in FIG. 11 supports three main roles and corresponding GUIs are grouped together for each role.

Domain Expert GUI: The domain experts can specify project solution specific information about input data and set parameter values on the selected analytical solution module templates.

IT Engineer GUI: In this screen, the IT engineer can set required IT related parameters to configure the execution environment such as external systems' file path and network address.

Data Scientist GUI: This GUI is used for the advanced settings which can further tune the analytic models and the analytical solution modules by the data scientists.

GUI for Flow Verification and Customization

Although the proposed system provides an automatic flow generator to instantiate analytical solution module templates with system configurations and other metadata, the domain experts have the right of final decision to the generated flows. The proposed system provides a set of GUIs to facilitate human intervention before deployment. The corresponding GUI have following features:

(1) Domain experts can verify and modify the generated flows.
(2) Domain experts can cut, copy, past, duplicate part of or all the flows.
(3) Domain experts can add additional operators before, in the middle, or after the generated flows.
(4) Domain experts can choose model deployment patterns, which means to specify which equipment data is used in the learning mode to generate the machine learning models and parameters, and to specify which learned model will be consumed in the application mode execution.

GUI for Integrated Management of Solution Module Deployment from Cloud to Edge

Since analytical solution modules can be deployed partially on the cloud and partially on the edge server. The proposed system provides integrated GUI for cloud/remote management of edge servers, including but not limited to:

(1) Registry of new edge server which can consume analytic models and execute analytical solution modules.
(2) Synchronization of analytic models and metadata between cloud server and edge servers.
(3) Deployment of analytic models and metadata with customized configurations.
(4) Execution control and result gathering of the analytical solution modules on the edge server.

Figure 12:
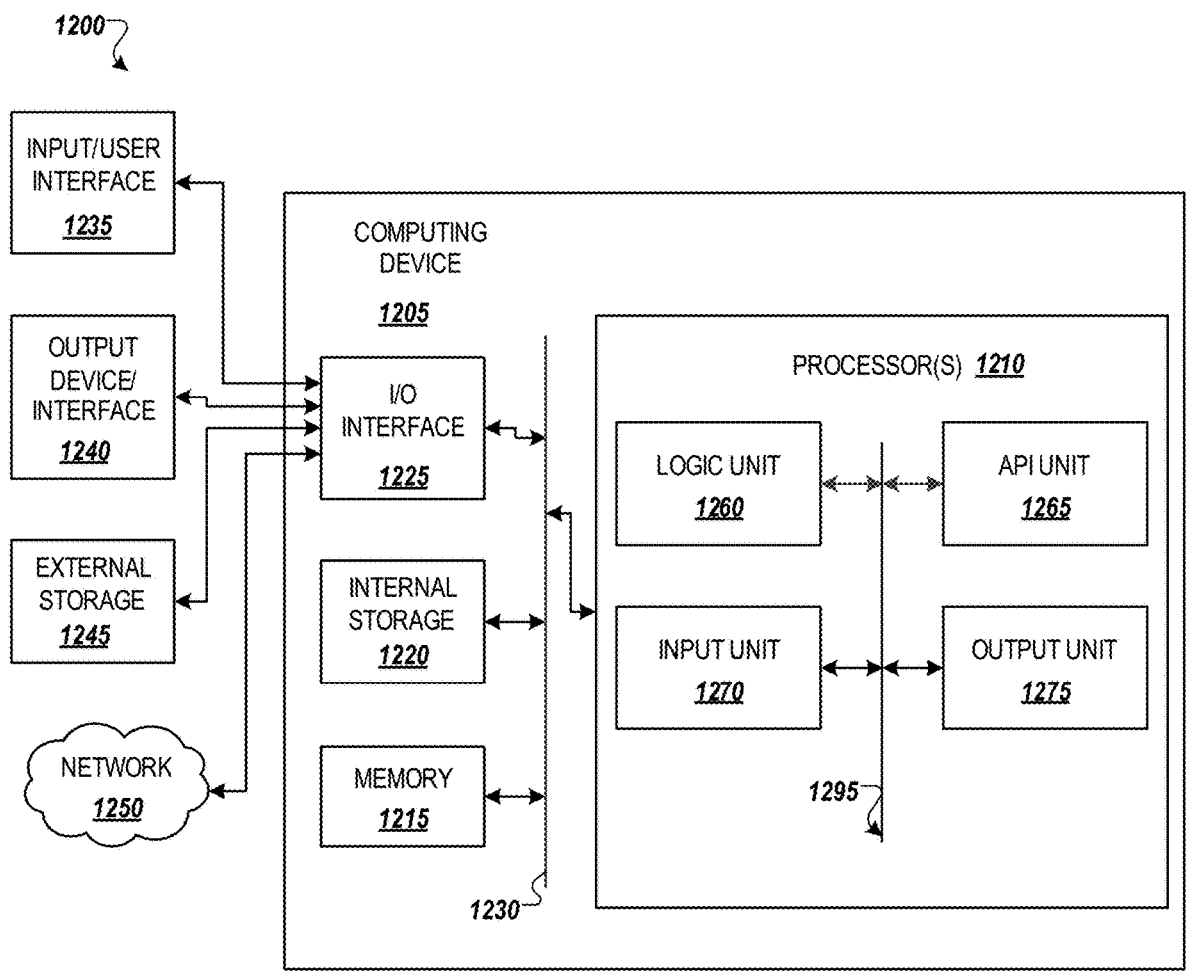
FIG. 12 illustrates an example computing environment with an example computer device suitable for use in some example implementations.

FIG. 12 illustrates an example computing environment with an example computer device suitable for use in some example implementations, such as a device to facilitate functionality for the system of phase I and/or phase II as illustrated in FIG. 1. In example implementations, there can be a first system involving a first computer device that is separate from a second system involving a second computer device. Such a configuration may be utilized because the first system is directed to the data scientist and involves a specialized computer device configured to facilitate data analytics operations and consoles, including consoles for flow definitions and operator definitions, as well as a console to provide executable code for generating data analytics. In contrast, the second system is configured to incorporate a module template library generated from the first system, and is configured for use by non-data scientists, such as customers, domain experts, and IT engineers, which would involve a different hardware and console configuration than the first system. However, depending on the desired implementation, both systems can also reside on a cloud that shares the same hardware (e.g., both integrated into the same computer device), and provisioned such that the first system is isolated from the second system through use of login credentials or different accessible GUIs as illustrated in FIG. 11, or otherwise in accordance with the desired implementation.

Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205. I/O interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

In an example implementation for a first system, processor(s) 1210 can be configured to process meta-data comprising flow definitions, operator definitions, and executable code to generate an analytics library into a database, the analytics library comprising a flow configuration template, operator configuration template, analytics platform configuration template, and wrapper code for instantiations of the flow configuration template, the operator configuration template, and the analytics platform configuration template; and execute a verification process on the executable code, wherein upon successful verification, the first processor is configured to facilitate access to the analytics library to the database in a second system as illustrated in FIGS. 1 and 2.

In an example implementation for a second system, processor(s) 1210 can be configured to instantiate executable analytics modules from executing the wrapper code on the flow configuration template, the operator configuration template, and the analytics platform configuration template as illustrated in FIG. 1.

In an example for a first system, processor(s) 1210 can be configured to conduct the verification process by creating a testing environment from the operator definitions as shown at; conducting unit testing on input data and parameter settings to the executable code in the testing environment to generate results as shown at 301-305 of FIG. 3 of FIG. 3; for the results of the unit testing being validated against provided results, conduct function testing to the executable code in the testing environment as shown at 306-308 of FIG. 3; and for the function testing being successful, indicating successful verification as shown at 311 of FIG. 3.

In an example implementation for a first system, processor(s) 1210 can be configured to generate the wrapper code from conducting schema matching on schemas derived from the operator definitions and the flow definitions, the conducting schema matching involving generating a target schema array and source schema array from the schemas derived from the operator definitions and the flow definitions as illustrated at 401-402 of FIG. 4; parsing each of the schemas in the target schema array for a search scheme, the search scheme being one of an exact element match, a star match, a single match with multiple options, and multiple matching with multiple options as illustrated in 403-408 of FIG. 4; and conducting the schema matching between the target schema array and the source schema array according to the search scheme as illustrated in 411-428 of FIG. 4.

In an example implementation for a first system, processor(s) 1210 can be configured to generate the flow configuration template, the operator configuration template, the analytics platform configuration template from specifying data to be used to generate models to be utilized in generation of the flow configuration template, the operator configuration template, and the analytics platform configuration template, the data specified according to a model hierarchy and to generate the wrapper code from assigning an execution flow based on the generated models as illustrated in FIGS. 5 and 6.

In an example implementation for a second system, processor(s) 1210 can be configured to instantiate executable analytics modules from executing the wrapper code on the flow configuration template, the operator configuration template, and the analytics platform configuration template by generating the executable analytics modules indicated in the analytics platform configuration template as separate analytics services according to a dependency order of the separate analytics services, each of the separate analytics services defined from the flow configuration template and the operator configuration template as illustrated in FIGS. 7-9.

In an example implementation for a second system, processor(s) 1210 can be configured to provide a graphical user interface (GUI) configured to provide ones of the instantiated executable analytics modules for execution based on input data types and execution mode; and upon receipt of a selection of one of the provided ones of the instantiated executable analytics modules, execute the selected one of the provided ones of the instantiated executable analytics modules on data provided to the second system as illustrated in FIGS. 10 and 11.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

What is claimed is:

1. A method, comprising:
providing meta-data comprising flow definitions, operator definitions, and executable code to a first system configured to generate a flow configuration template, operator configuration template, analytics platform configuration template, and wrapper code for instantiations of the flow configuration template, the operator configuration template, and the analytics platform configuration template from the provided metadata, wherein the flow configuration template, the operator configuration template, the analytics platform configured to satisfy a plurality of use cases;
executing a verification process on the executable code by the first system, wherein upon successful verification, generating an analytics library into a database and facilitating access to the analytics library to the database in a second system, the analytics library comprising the flow configuration template, the operator configuration template, the analytics platform configuration template, and the wrapper code;
wherein the second system instantiates executable analytics modules from executing the wrapper code on the flow configuration template, the operator configuration template, and the analytics platform configuration template, wherein each executable analytics module of the instantiated executable analytics modules is targeted for a specific user case of the plurality of use cases,
wherein the operator definitions and the flow definitions comprise input and output data schema structure, and wherein the first system is configured to generate the wrapper code from conducting schema matching on the input and output data schemas derived from the operator definitions and the flow definitions, the conducting schema matching comprising:
generating a target schema array and source schema array from the input and output data schemas derived from the operator definitions and the flow definitions;
parsing each of the schemas in the target schema array for a search scheme, the search scheme being one of an exact element match, a star match, a single match with multiple options, and multiple matching with multiple options; and
conducting the schema matching between the target schema array and the source schema array according to the search scheme.

2. The method of claim 1, wherein the verification process comprises:
creating a testing environment from the operator definitions;
conducting unit testing on input data and parameter settings to the executable code in the testing environment to generate results;
for the results of the unit testing being validated against provided results, conduct function testing to the executable code in the testing environment;
for the function testing being successful, indicating successful verification.

3. The method of claim 1, wherein the first system is configured to generate the flow configuration template, the operator configuration template, the analytics platform configuration template from specifying data to be used to generate models to be utilized in generation of the flow configuration template, the operator configuration template, and the analytics platform configuration template, the data specified according to a model hierarchy;
wherein the first system is configured to generate the wrapper code from assigning an execution flow based on the generated models.

4. The method of claim 1, wherein the second system instantiates executable analytics modules from executing the wrapper code on the flow configuration template, the operator configuration template, and the analytics platform configuration template by:
generating the executable analytics modules indicated in the analytics platform configuration template as separate analytics services according to a dependency order of the separate analytics services, each of the separate analytics services defined from the flow configuration template and the operator configuration template.

5. The method of claim 1, further comprising:
providing a graphical user interface (GUI) in the second system configured to provide ones of the instantiated executable analytics modules for execution based on input data types and execution mode; and
upon receipt of a selection of one of the provided ones of the instantiated executable analytics modules, executing the selected one of the provided ones of the instantiated executable analytics modules on data provided to the second system.

6. A non-transitory computer readable medium, storing instructions, which when executed by a hardware processor, perform a process comprising:
providing meta-data comprising flow definitions, operator definitions, and executable code to a first system configured to generate a flow configuration template, operator configuration template, analytics platform configuration template, and wrapper code for instantiations of the flow configuration template, the operator configuration template, and the analytics platform configuration template from the provided metadata, wherein the flow configuration template, the operator configuration template, the analytics platform configured to satisfy a plurality of use cases;
executing a verification process on the executable code by the first system, wherein upon successful verification, generating an analytics library into a database and facilitating access to the analytics library to the database in a second system, the analytics library comprising the flow configuration template, the operator configuration template, the analytics platform configuration template, and the wrapper code;
wherein the second system instantiates executable analytics modules from executing the wrapper code on the flow configuration template, the operator configuration template, and the analytics platform configuration template, wherein each executable analytics module of the instantiated executable analytics modules is targeted for a specific use case of the plurality of use cases,
wherein the operator definitions and the flow definitions comprise input and output data schema structure, and wherein the first system is configured to generate the wrapper code from conducting schema matching on the input and output data schemas derived from the operator definitions and the flow definitions, the conducting schema matching comprising:

generating a target schema array and source schema array from the input and output data schemas derived from the operator definitions and the flow definitions;

parsing each of the schemas in the target schema array for a search scheme, the search scheme being one of an exact element match, a star match, a single match with multiple options, and multiple matching with multiple options; and conducting the schema matching between the target schema array and the source schema array according to the search scheme.

7. The non-transitory computer readable medium of claim 6, wherein the verification process comprises:

creating a testing environment from the operator definitions;

conducting unit testing on input data and parameter settings to the executable code in the testing environment to generate results;

for the results of the unit testing being validated against provided results, conduct function testing to the executable code in the testing environment;

for the function testing being successful, indicating successful verification.

8. The non-transitory computer readable medium of claim 6, wherein the first system is configured to generate the flow configuration template, the operator configuration template, the analytics platform configuration template from specifying data to be used to generate models to be utilized in generation of the flow configuration template, the operator configuration template, and the analytics platform configuration template, the data specified according to a model hierarchy;

wherein the first system is configured to generate the wrapper code from assigning an execution flow based on the generated models.

9. The non-transitory computer readable medium of claim 6, wherein the second system instantiates executable analytics modules from executing the wrapper code on the flow configuration template, the operator configuration template, and the analytics platform configuration template by:

generating the executable analytics modules indicated in the analytics platform configuration template as separate analytics services according to a dependency order of the separate analytics services, each of the separate analytics services defined from the flow configuration template and the operator configuration template.

10. The non-transitory computer readable medium of claim 6, the instructions further comprising:

providing a graphical user interface (GUI) in the second system configured to provide ones of the instantiated executable analytics modules for execution based on input data types and execution mode; and upon receipt of a selection of one of the provided ones of the instantiated executable analytics modules, executing the selected one of the provided ones of the instantiated executable analytics modules on data provided to the second system.

11. A system, comprising:

a first system comprising a first processor circuit configured to:

process meta-data comprising flow definitions, operator definitions, and executable code to generate a flow configuration template, operator configuration template, analytics platform configuration template, and wrapper code liar instantiations of the flow configuration template, the operator configuration template, and the analytics platform configuration template, wherein the flow configuration template, the operator configuration template, the analytics platform configured to satisfy a plurality of use cases; and execute a verification process on the executable code, wherein upon successful verification, generate an analytics library into a database and facilitate access to the analytics library to the database in a second system, the analytics library comprising the flow configuration template, the operator configuration template, the analytics platform configuration template, and the wrapper code;

a second system comprising a second processor circuit configured to instantiate executable analytics modules from executing the wrapper code on the flow configuration template, the operator configuration template, and the analytics platform configuration template, wherein each executable analytics module of the instantiated executable analytics modules is targeted for a specific use case of the plurality of use cases, wherein the operator definitions and the flow definitions comprise input and output data schema structure, and wherein the first process is configured to generate the wrapper code from conducting schema matching on the input and output data schemas derived from the operator definitions and the flow definitions, the conducting schema matching comprising:

generating a target schema array and source schema array from the input and output data schemas derived from the operator definitions and the flow definitions;

parsing each of the schemas in the target schema array for a search scheme, the search scheme being one of an exact element match, a star match, a single match with multiple options, and multiple matching with multiple options; and conducting the schema matching between the target schema array and the source schema array according to the search scheme.

12. The system of claim 11, wherein the first processor is configured to conduct the verification process by:

creating a testing environment from the operator definitions;

conducting unit testing on input data and parameter settings to the executable code in the testing environment to generate results;

for the results of the unit testing being validated against provided results, conduct function testing to the executable code in the testing environment;

for the function testing being successful, indicating successful verification.

13. The system of claim 11, wherein the first processor is configured to generate the flow configuration template, the operator configuration template, the analytics platform configuration template from specifying data to be used to generate models to be utilized in generation of the flow configuration template, the operator configuration template, and the analytics platform configuration template, the data specified according to a model hierarchy;

wherein the first processor is configured to generate the wrapper code from assigning an execution flow based on the generated models.

14. The system of claim 11, wherein the second processor instantiates executable analytics modules from executing the wrapper code on the flow configuration template, the operator configuration template, and the analytics platform configuration template by:
  generating the executable analytics modules indicated in the analytics platform configuration template as separate analytics services according to a dependency order of the separate analytics services, each of the separate analytics services defined from the flow configuration template and the operator configuration template.

15. The system of claim 11, wherein the second processor is configured to:
  provide a graphical user interface (GUI) configured to provide ones of the instantiated executable analytics modules for execution based on input data types and execution mode; and
  upon receipt of a selection of one of the provided ones of the instantiated executable analytics modules, execute the selected one of the provided ones of the instantiated executable analytics modules on data provided to the second system.

* * * * *